Nov. 5, 1929.  W. YOUNG  1,734,663
SELF SETTING ANIMAL TRAP
Filed Dec. 17, 1928   2 Sheets-Sheet 1
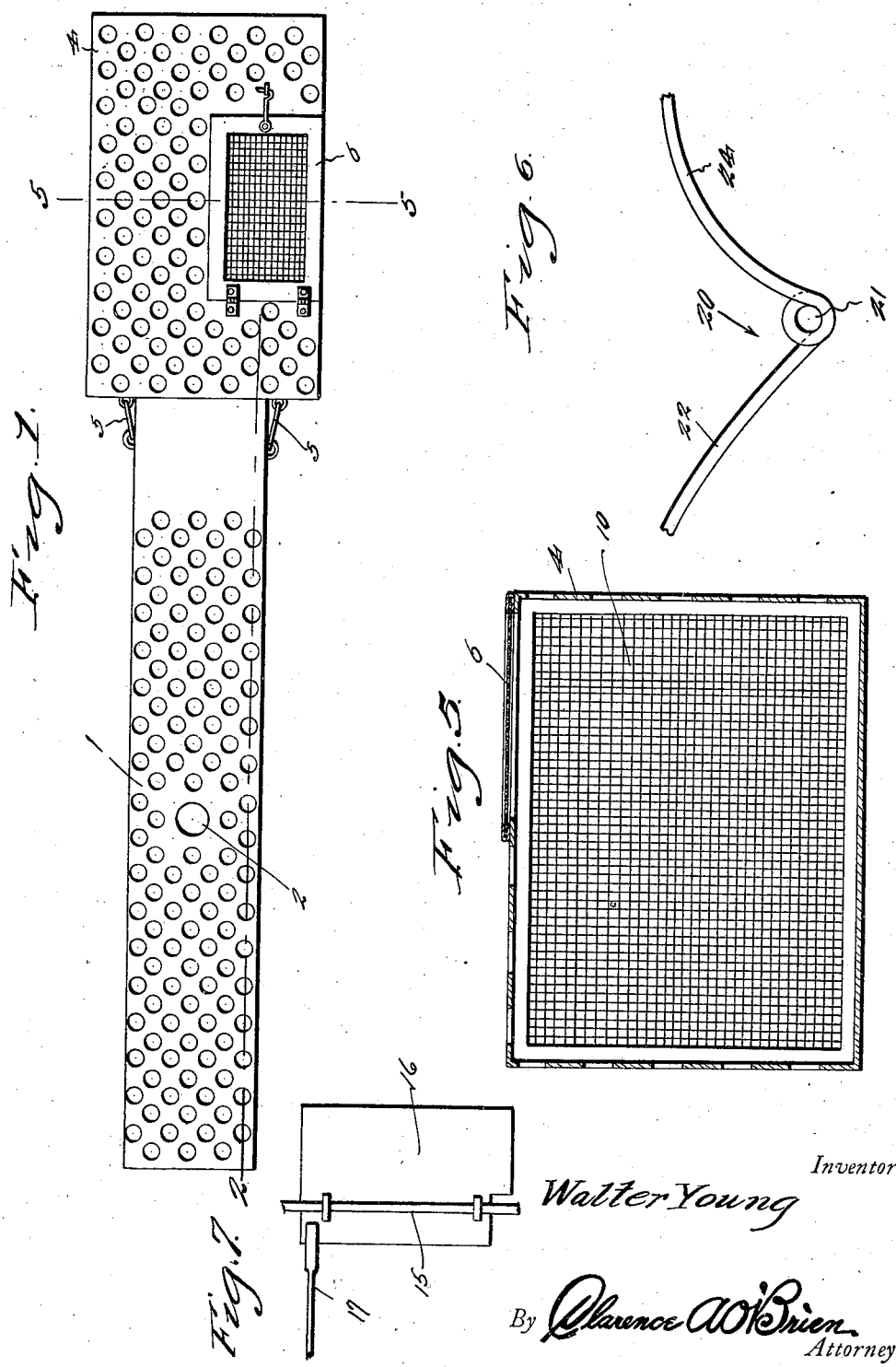
Inventor
Walter Young
By Clarence A. O'Brien
Attorney

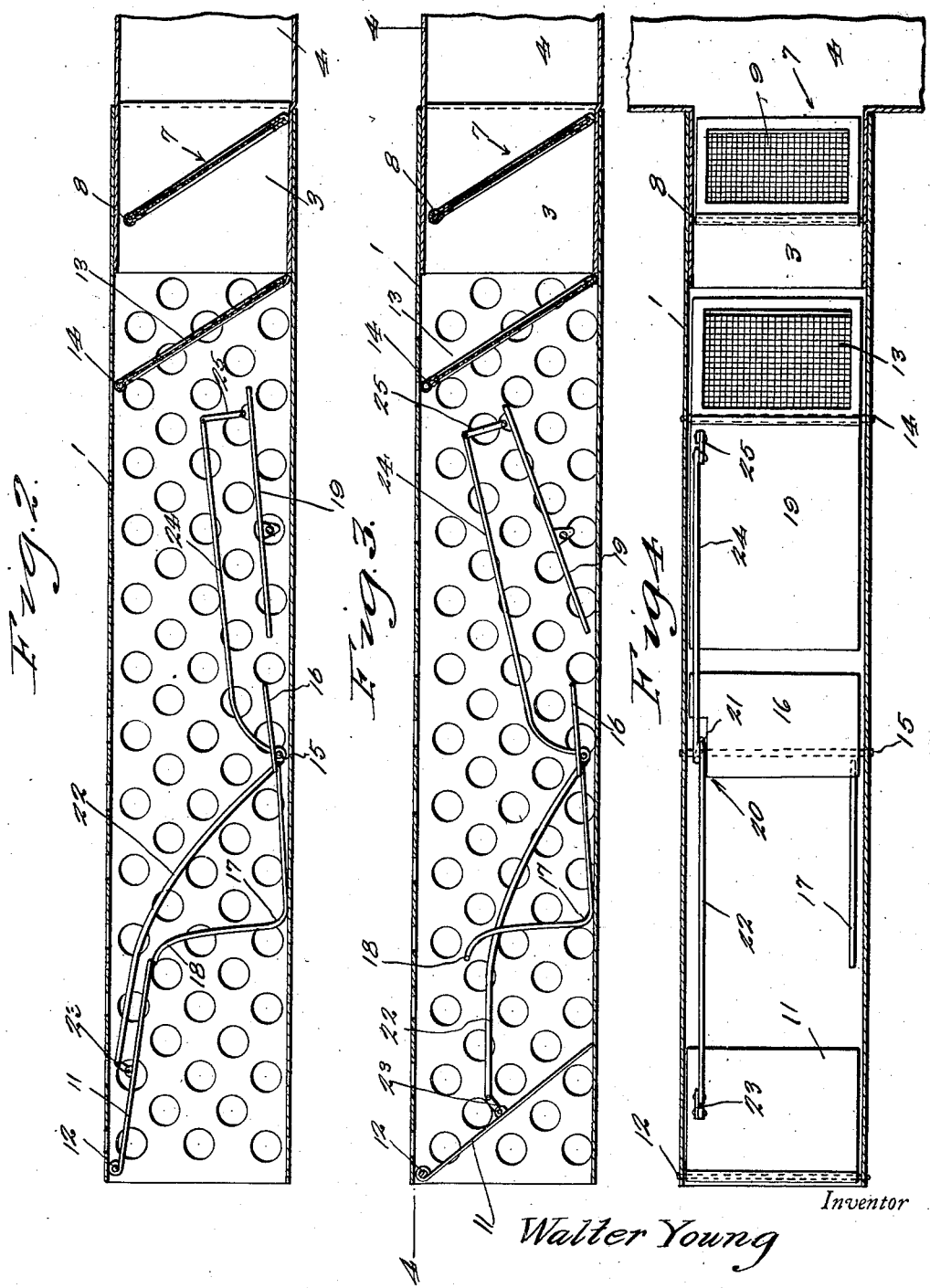

Patented Nov. 5, 1929

1,734,663

UNITED STATES PATENT OFFICE

WALTER YOUNG, OF MONTE VISTA, COLORADO

SELF-SETTING ANIMAL TRAP

Application filed December 17, 1928. Serial No. 326,582.

The present invention relates to improvements in animal traps and has reference more particularly to a trap of the self setting type.

One of the important objects of the present invention is to provide a trap that is particularly adapted to be used in catching fur bearing animals, said trap including a casing, within which the trapping mechanism is arranged, one end of the casing being adapted to communicate with an imprisoning compartment.

A further object is to provide a self-setting animal trap that will at all times be positive and efficient in its operation, the same being further simple in construction, inexpensive, strong and durable, and further well adapted to the purpose for which it is designed.

Other objects and advantages of the invention will become apparent as the nature of the invention proceeds and when taken in connection with the accompanying drawings.

In the accompanying drawings, forming a part of this application and wherein like reference characters designate like parts throughout the several views:

Figure 1 is a top plan view of the animal trap embodying my invention.

Figure 2 is a longitudinal sectional view taken approximately on the line 2—2 of Figure 1.

Figure 3 is a view similar to Figure 2, showing the parts in their positions immediately after the trigger arm has been moved out of engagement with the pivoted door at the entrance of the casing.

Figure 4 is a sectional view, taken approximately on the line 4—4 of Figure 3, looking downwardly.

Figure 5 is a vertical sectional view through the imprisoning or entrapping compartment.

Figure 6 is a fragmentary detail elevational view of the substantially V-shaped unit forming an important part of the present invention, and Figure 7 is a bottom plan view of the tripping platform showing the rod on which said platform is mounted for rockable movement and also disclosing a portion of the trigger arm.

In the drawings, wherein for the purpose of illustration is shown the preferred embodiment of my invention, the numeral 1 designates a substantially rectangular shaped elongated casing that is open at its respective ends, said casing being perforated at its sides and top. The central portion of the top of the casing is formed with an enlarged opening 2 through which the bait may be suspended in any appropriate manner.

The rear end of the casing 1 is slidably fitted over a similar shaped neck 3, that projects from the forward end of the entrapping or imprisoning chamber 4 and for further securing these parts together, suitable securing means such as are shown generally at 5, in Figure 1, are arranged on the opposite sides of the rear end portion of the casing for cooperation with the adjacent portions of the forward end of the compartment or chamber 4. The neck portion 3 constitutes an entrance for the compartment 4, and this compartment is also perforated and in addition a door 6 is arranged in the top of the compartment whereby access to the interior thereof may be had for removing the entrapped animal.

Arranged within the neck portion 3 and disposed at an incline therein is the vertically swinging gate 7, the same being pivoted at its upper edge as at 8, and this gate extends at an angle in a rearward direction and the lower edge of the gate normally rests on the bottom of the neck 3, so that said gate can only swing in one direction and the purpose of the gate is to prevent the return of the entrapped animals from the compartment or chamber 4, to the casing 1. The gate is preferably constructed in the form of a frame, having a screened insert 9, mounted in the frame, as more clearly disclosed in Figure 4.

The rear end of the compartment or chamber 4 also includes a screen as shown at 10, in Figure 5.

A solid door 11 is provided for the forward end of the casing 1 and this door is pivoted at its upper edge as at 12. This door is also disposed at an incline and extends in a rearward direction and the bottom edge of the door will engage with the bottom of the casing when the door is tripped in the manner to be presently described.

Arranged within the rear portion of the casing 1 for disposition directly forwardly of the neck portion 3 is the vertically swinging gate 13, that is pivoted at its upper edge as at 14 and this gate is of substantially the same construction as the gate 7, arranged within the neck portion 3 and operates in the same manner.

Journaled for rotation within the intermediate portion of the casing 1 adjacent the bottom thereof is the rod 15 the ends thereof extending through the opposite sides of the casing. Secured on the rod 15 for rockable movement therewith is the tripping platform 16. An angular trigger arm 17 has the free end of the horizontal portion thereof fixedly secured to the platform 16, adjacent one of the forward corners of the platform, the upper end of the vertical portion of the trigger arm being slightly curved, as shown at 18 in Figure 3 and upon which curved portion, the free edge of the door 11 is adapted to rest when the trap is set. This is clearly shown in Figure 2.

A resetting treadle 19 is arranged for rockable movement within the casing 1, directly rearwardly of the tripping platform 16.

Forming a salient part of the present invention is the substantially V-shaped unit denoted generally by the numeral 20 and which unit is formed from an elongated piece of wire that is provided with a coil 21 at the apex portion of said V-shaped portion and the coil 21 is secured on the rod 15 for rockable movement therewith at the end opposite to that portion of the platform to which the angular trigger arm 17 is attached. Upon referring to Figure 4, it will be observed that the other forward end portion of the platform 16 is cut out to accommodate the V-shaped unit 20. The forwardly extending arm 22 of the V-shaped unit 20 is operatively connected to the upper face of the intermediate portion of the vertically swinging door 11, by a link 23. The free end of the rearwardly extending arm 24 of the V-shaped unit 20 is operatively connected to the face of the rear edge portion of the treadle 19, by a similar link shown at 25.

Upon referring to Figure 4, it will be observed that the V-shaped unit 20 is located adjacent one side of the casing, and the trigger arm 17 is located adjacent the opposite side of said casing so that the central portion of the platform and trigger respectively are unobstructed.

The operation of my improved trap will be readily understood and is as follows:

The trap is initially set as shown in Figure 2 so that the door 11 is retained in a raised position by the trigger arm 17. The animal enters through the forward end of the casing and upon stepping upon the platform 16, the trigger arm 17 will be swung upwardly and rearwardly to cause the curved portion 18 to become disengaged from the forward edge portion of the door 11, and this door will, by gravity, swing downwardly to the position shown in Figure 3, and thus imprison the victim. The animal now entrapped finding no means of retreat will pass rearwardly in the casing and will necessarily step upon the resetting treadle 19, and this treadle cooperates with the V-shaped unit 20 to swing the door 11 outwardly at the same time actuating the platform and the trigger arm to again position the curved upper end of the angular trigger arm beneath the lower edge portion of the door 11, so that said door will be set and held in an open position as indicated in Figure 2.

The animal then gains access to the entrapping compartment or chamber 4 by forcing the gates 13 and 7 respectively upwardly and these gates will close behind the animal so that the animal cannot retreat back into the casing and will consequently be imprisoned within the chamber 4.

The animals imprisoned within the compartment or chamber 4 may be removed therefrom through the opening normally covered by the door 6, and while I have shown the trap as being adapted to particularly catch muskrats, it is to be understood that other fur bearing animals may be captured, without injuring the animals or damaging the skin.

It will thus be seen from the foregoing description that I have provided an animal trap of the self setting type that will at all times be positive and efficient in its operation, the same being further simple and inexpensive, yet strong and durable.

While I have shown the preferred embodiment of my invention, it is to be understood that various changes in the size, shape and arrangement of parts may be resorted to, without departing from the spirit of the invention or the scope of the appended claims.

I claim:

1. In an animal trap of the class described, a casing provided with an entrance at one end and with an exit at its opposite end, a vertically swinging door for the entrance hinged at its upper edge within the casing, a similar door at the rear end of the casing, an imprisoning chamber having communication with the rear end of the casing, a rockable tripping platform arranged in the intermediate portion of the casing, a trigger arm carried by the forward portion of the platform and normally holding the first mentioned door in a raised position, a rockable treadle arranged within the casing rearwardly of the platform, said first mentioned door being released when the tripping platform is tilted and the trigger arm is moved out of engagement with said door, and cooperating means between said door, the platform and the treadle for resetting the trigger arm and the first mentioned door, when the treadle is tilted, said means comprising a pair of rods operatively connected at their adjacent ends with the platform, and links operatively connecting the outer ends of the rods with the aforesaid door and the treadle respectively.

2. In an animal trap, a casing open at its forward end, an imprisoning chamber communicating with the rear end of the casing, a vertically swinging door hinged at its upper edge within the forward end of the casing, a transverse rod mounted for rockable movement within the intermediate portion of the casing adjacent the bottom thereof, a platform secured on the rod for rockable movement therewith, an angular trigger arm extending forwardly from the platform, and normally supporting the door in a raised position, a rockable treadle mounted in the casing rearwardly of the platform, said door being released when the platform is tilted, and the trigger arm is moved out of engagement with the door, and means cooperatively associated with the door, platform and treadle for resetting the trigger arm and the door when the treadle is tilted, said means comprising a V-shaped unit having its apex portion fixedly secured on said rod, one of the arms of the V-shaped unit being operatively connected with the door, the other arm of the V-shaped unit being operatively connected with the rockable treadle.

In testimony whereof I affix my signature.

WALTER YOUNG.